United States Patent [19]

Livingstone et al.

[11] Patent Number: 5,018,357
[45] Date of Patent: May 28, 1991

[54] TEMPERATURE CONTROL SYSTEM FOR A CRYOGENIC REFRIGERATION

[75] Inventors: James Livingstone, Framingham; Graham J. Higham, Ashland, both of Mass.; Gerald R. Pruitt, Pancho Palos Verdes, Calif.

[73] Assignee: Helix Technology Corporation, Waltham, Mass.

[21] Appl. No.: 488,418

[22] Filed: Mar. 1, 1990

Related U.S. Application Data

[63] Continuation of Ser. No. 256,042, Oct. 11, 1988, abandoned.

[51] Int. Cl.[5] .............................................. F25B 9/00
[52] U.S. Cl. ............................................ 62/6; 60/520; 62/228.1
[58] Field of Search ............. 62/6, 209, 228.1, 226; 60/520; 417/45, 18

[56] References Cited

U.S. PATENT DOCUMENTS

| | | | |
|---|---|---|---|
| 3,802,211 | 4/1974 | Bamberg et al. | 62/6 |
| 4,373,663 | 2/1983 | Hammer | 236/78 D |
| 4,417,448 | 11/1983 | Horn et al. | 62/6 |
| 4,534,176 | 8/1985 | Horn et al. | 60/520 X |
| 4,543,793 | 10/1985 | Chellis et al. | 62/6 |
| 4,545,209 | 10/1985 | Young | 62/6 |
| 4,642,547 | 2/1987 | Redlich | 322/8 |
| 4,664,685 | 5/1987 | Young | 62/6 |
| 4,675,563 | 6/1987 | Goldowsky | 310/15 |
| 4,761,960 | 8/1988 | Higham et al. | 62/6 |
| 4,783,968 | 11/1988 | Higham et al. | 62/6 |
| 4,925,089 | 5/1990 | Chaparro et al. | 236/78 D |

FOREIGN PATENT DOCUMENTS

| | | | |
|---|---|---|---|
| 81302879.2 | 6/1981 | European Pat. Off. | |
| 0220824 | 5/1987 | European Pat. Off. | 62/6 |
| 2185834 | 7/1987 | United Kingdom. | |

OTHER PUBLICATIONS

Aeroflex Laboratories Incorporated; "The Model 1513 Dual-Hybrid Cryocooler Motor Control".

Primary Examiner—William E. Wayner
Attorney, Agent, or Firm—Hamilton, Brook, Smith & Reynolds

[57] ABSTRACT

In a cryogenic refrigeration utilizing a linear drive motor, a temperature control system controls the displacement of an armature reciprocating at a fixed frequency to adjust the operating temperature of a working fluid at the cold end of a cold finger. Linear drive motors using dynamic absorbers to reduce vibration operate within the narrow frequency range to which the absorber is tuned. Controlling the maximum displacement of the armature used to compress the working fluid results in the ability to adjust the temperature at the cold end of the refrigeration without altering the frequency of operation.

10 Claims, 5 Drawing Sheets

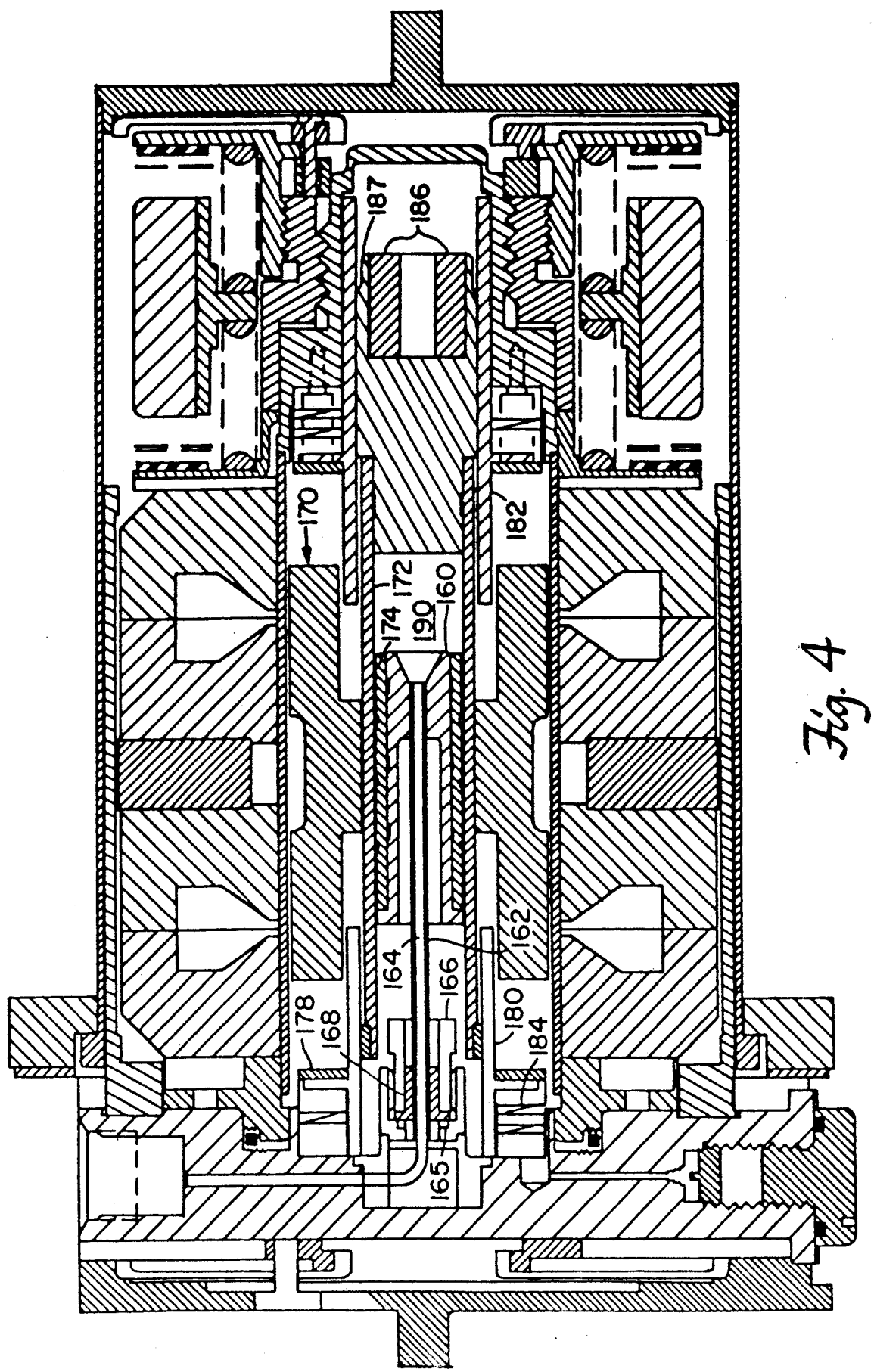

TEMPERATURE CONTROL SYSTEM FOR A CRYOGENIC REFRIGERATION

This is a continuation of application Ser. No. 07/256,042, filed on Oct. 11, 1988, now abandoned.

BACKGROUND

This invention relates to cryogenic refrigerators, or cryocoolers utilizing linear drive motors having pistons or displacers which reciprocate in cylinders. Such refrigerators include Gifford-McMahon or Stirling refrigerators and expansion engines.

In various types of cryogenic refrigerators, a working fluid such as helium is introduced into a cylinder, and the fluid is expanded at one end of a piston to cool the cylinder. For example, in Gifford-McMahon type refrigerators, high pressure working fluid may be valved into the warm end of the cylinder. Then the fluid is passed through a regenerator by movement of a displacer-type piston. The fluid which has been cooled in the regenerator is then expanded at the cold end of the displacer. The displacer movement may be controlled by either fluid pressure differentials or by a mechanical drive.

A control system for a cryogenic refrigerator is disclosed in U.S. Pat. No. 4,543,793. One or more parameters of a reciprocating-piston type refrigerator are monitored to provide an electrical feedback signal. That signal is processed to control the timing of the piston movement and or the flow of refrigeration gas into the refrigerator. Preferably, the feedback signal is an indication of the position of the piston within its cylinder and/or the temperature at the cold end of the cylinder throughout a refrigeration cycle.

Continuous position indication may be provided by a linear variable displacement transformer or by a rotary encoder or by other means. Preferably, the feedback signal is used to control valves which introduce the refrigeration gas into the cylinder or a piston drive motor. In a pneumatically driven refrigerator, the feedback signal may be used to control valves to and from both the refrigeration cylinder and the drive cylinder. By controlling the stroke, the temperature of the cold end of the refrigerator can be controlled.

A split Stirling refrigerator is disclosed in U.S. Pat. No. 4,664,685 wherein a compressor provides a nearly sinusoidal pressure variation to a refrigerant gas in communication with a cold finger. The compressor is comprised of a linear drive motor having a drive coil which drives a reciprocating armature. A detector circuit is coupled to the drive coil for sensing an electrical parameter of the coil which is a function of movement of the armature. Motor drive circuitry which applies current to the drive coil is responsive to the sensed electrical parameter in controlling movement of the piston element. The detector circuit can be connected to sense back EMF in a displacer drive motor within the cold finger.

Rotary driven compressors of cryogenic refrigerators have been known to employ controlled variations in speed to adjust the temperature at the cold end of the refrigerator.

DISCLOSURE OF THE INVENTION

In a cryogenic refrigerator where the magnitude of the displacement of the compressor armature is adjusted to effect changes in the temperature of the working fluid at the cold end of the refrigerator.

A reciprocating magnetic armature can be driven by an electrically pulsed coil so that the armature alternately compresses and expands the working fluid. The working fluid is in communication with a cold finger of the refrigerator. By controlling the pulse width of the signal that drives the armature, the armature displacement can be controlled. By controlling armature displacement in this manner the temperature at the cold end of a displacer within the cold finger can be precisely adjusted for those applications requiring variable temperatures, or provide constant temperature in conditions of varying heat loads or ambient conditions.

To precisely control the displacement of the armature, the position of the armature must be accurately determined. A Hall-effect sensor can be positioned along the wall or at the end of the operating volume of the armature to sense the location of a magnet attached to the armature. The sensor generates an electrical signal whose voltage is correlated to a particular position of the armature within the operating volume.

In cryogenic refrigerators using dynamic absorbers or counter balance systems to reduce vibration generated by the reciprocating armature, where the operating frequency of the armature is confined to a certain range, such a temperature control system has many advantages. By maintaining a fixed frequency of operation for the armature, a dynamic absorber can be used to attenuate vibration of the refrigerator housing.

The temperature control system of the present invention provides for control of the amplitude of motion of the armature while it reciprocates at the same frequency at which the dynamic absorber is tuned to oscillate.

When the desired temperature of the system is chosen, the temperature at the cold end of the displacer is compared with the desired temperature and an electrical signal is forwarded to the control circuit of the linear drive motor to increase or decrease the displacement of the reciprocating armature.

As the temperature changes within the cold finger assembly, the temperature sensor adjacent the cold finger adjusts the armature displacement to slow the rate of temperature change. As the temperature of the refrigerator approaches the desired level, the armature displacement is gradually altered so that the temperature does not progress beyond the desired level.

The above, and other features of the invention including various novel details of construction and combination of parts, will now be more particularly described with reference to the accompanying drawings and pointed out in the claims. It will be understood that the particular temperature control system for cryogenic refrigerators embodying the invention is shown by way of illustration only and not as a limitation of the invention. The principle features of this invention may be employed in various embodiments without departing from the scope of the invention.

BRIEF DESCRIPTION OF THE DRAWINGS

FIG. 4 is a cross-sectional view of another preferred embodiment of a linear drive assembly of a cryogenic refrigerator.

DETAILED DESCRIPTION OF THE INVENTION

Figure 1:
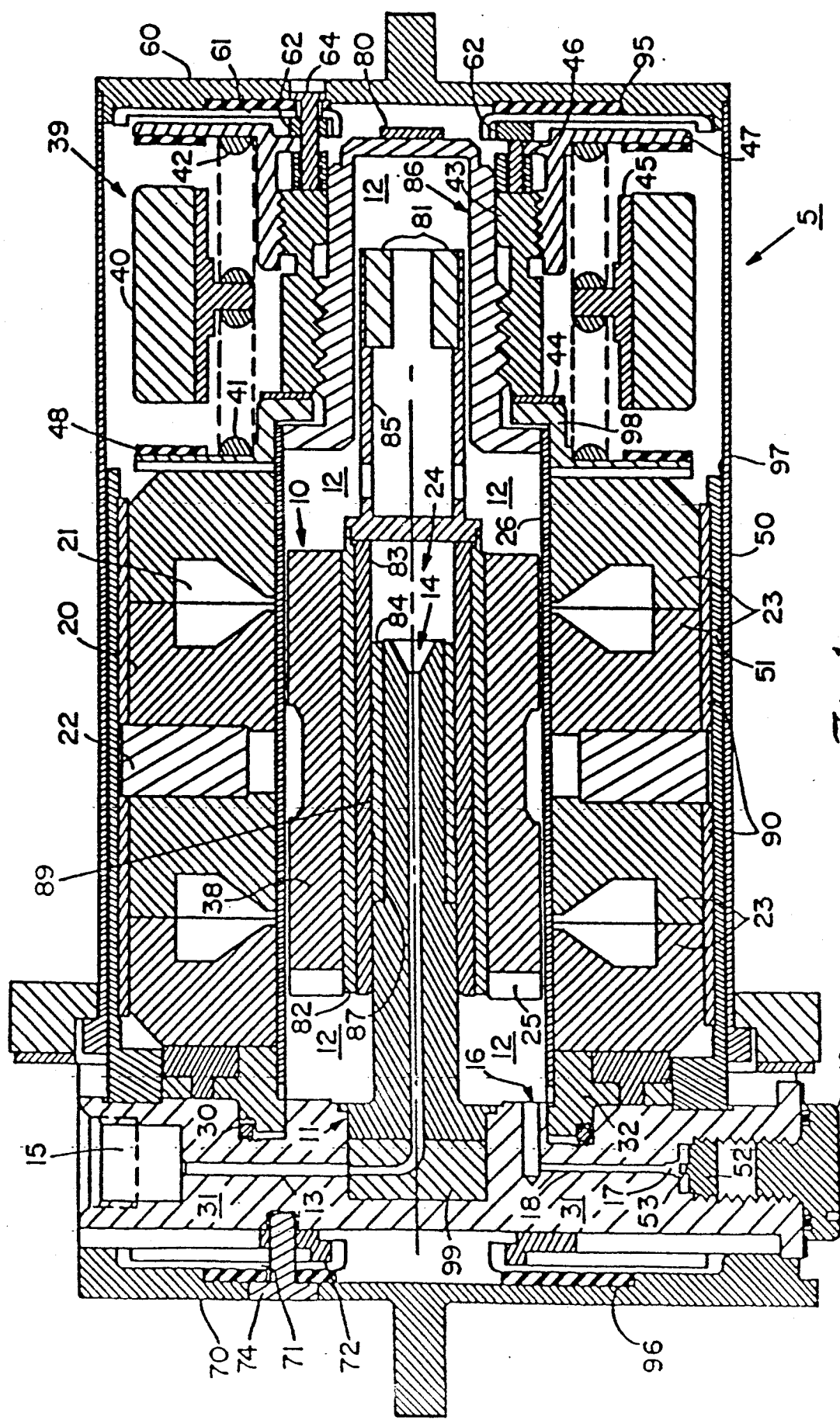
FIG. 1 is a cross-sectional view of a linear drive assembly of a cryogenic refrigerator of the present invention.

A linear drive assembly of a helium cryogenic refrigerator utilizing a temperature control system of the present invention is illustrated in FIG. 1. A linear motor is used to control the movement of an armature 10 in the compressor 5. The linear motor utilizes an involute laminated stator 20 first disclosed in U.S. Pat. No. 4,761,960 of G. Higham et al. filed July 14, 1986 entitled "Cryogenic Refrigeration System Having an Involuted Laminated Stator for its Linear Drive Motor."

As shown in FIG. 1, this compressor 5 comprises a reciprocating armature 10 which compresses helium gas in a compression space 24. From the compression space 24 the gas passes through a port 14 in the stationary piston 11 to pre-formed bores through the piston 11 and plate 31 to form conduit 13. Conduit 13 runs along the core of stationary piston 11, then curves at a right angle in insert 99 to a gas fitting assembly 15. From the gas fitting assembly 15, gas is delivered to a cold finger of a cryogenic refrigerator such as a split Stirling refrigerator in which a displacer is housed as disclosed in U.S. Pat. No. 4,545,209. The stationary piston 11, mounted at one end onto plate 31, is the sole support for armature 10.

The compressor is charged with helium gas through the port 17. The gas is allowed to communicate with an armature volume 12 through port 16 which is in communication with a second pre-formed conduit 18.

The armature 10 comprises an iron mass 38 fixed to a liner core 82. Iron is used because of its high magnetic permeability and high magnetic induction; however, other materials having the same characteristics may be used. A tungsten alloy ring or other high density non-magnetic material 25 may be incorporated at one end of the armature to give more mass to adjust the resonant frequency of operation and to help keep the armature's center of gravity within the confines of the clearance seal of the piston.

Preferably, the armature 10 is fitted with a ceramic cylinder 83 to provide a clearance seal with the stationary piston. It is preferred that a sleeve 82 made of non-magnetic stainless steel or aluminum line the cylinder 83 to provide structural support to the ceramic cylinder. A cermet liner 84 is mounted on the piston 11 to form part of the clearance seal.

Surrounding the armature 10 just described is a pressure housing 26. The size of the pressure housing is constructed to allow helium gas in the armature volume 12 to flow freely between the pressure housing 26 and the iron mass 38 as the armature 10 shuttles back and forth.

A stator 20 is located around the perimeter of the pressure housing 26. The stator 20 comprises two coils 21 positioned between involuted laminations 23 and separated by a magnet 22. This stator assembly is further described in U.S. Pat. No. 4,761,960, by G. Higham et al. recited above, which is incorporated herein. The splitting of the involute stator contributes to the amount of stray flux generated about the coils. Two shields 90 have been concentrically disposed about the involute lamination 23 to convey the magnetic flux lines along the inside wall 51 of the housing 50.

As a consequence of the armature 10 reciprocating back and forth, mechanical vibrations are produced by the compressor 5. To eliminate the vibrations, a passive vibration absorber or dynamic absorber 39 is attached to one end of the compressor and is tuned to resonate at the same frequency as the compressor's operating frequency. Preferably, the dynamic absorber 39 comprises a counterbalance mass 40 mounted with flange 45 between two springs 41 and 42 having small damping characteristics. As a result, the axial motion of the compressor is countered by the axial vibration from the counterbalance mass 40 of the absorber 39. A further description of dynamic absorber operation is found in U.S. Pat. No. 4,783,968, of G. Higham et al., filed Aug. 8, 1986, entitled "A Vibration Isolation System for a Linear Reciprocating Machine." The present system has bumpers 48 on the front 98 and rear 47 spring supports to absorb any impact of the absorber against the mounting frame of the compressor. The absorber system is mounted onto the housing extension 86 by ring nut 43. A spacer 44 is used to properly adjust the distance between the front 98 and rear 47 spring supports. The screw flange 46 is used to attach the flat spring 61 to the end of the compressor.

The compressor system utilizes isolators mounted on opposite ends of the compressor. The two isolators have flat spiral springs 61 and 71 which are soft in the axial direction while being very stiff in the radial direction. The outer diameter of the two springs 61 and 71 are attached to the housing end plates 60 and 70 respectively. The inner diameters are mounted onto flanges 62 and 72 and in turn attached to a screw flange 46 and housing plate 31, respectively, using bolts 64 and 74. The inner and outer diameter of the two springs are connected by a plurality of spiral arms. The springs are mounted on elastomeric material 95 and 96 located at both ends of compressor 5 providing a substantial level of damping to the isolator system.

A soft metallic gasket 30 is configured between the plate 31 and flange 32 to seal the armature volume 12 of the linear drive unit from the external atmosphere. In order to detect the position of the armature a sensor 80 is used to detect a target magnet 81 fitted at one end of the armature 10. The magnet 81 is mounted on an extended cylinder 85 that oscillates within an extention 86 of the armature housing 26 during motor operation. This extension permits the utilization of an otherwise unused volume within a countermass system 39 concentrically disposed about the extension 86. By isolating the magnet 81 and sensor 80 away from the stator 20, the magnetic field of magnet 81 is decoupled from the magnetic field of the stator magnet 22.

Figure 2:
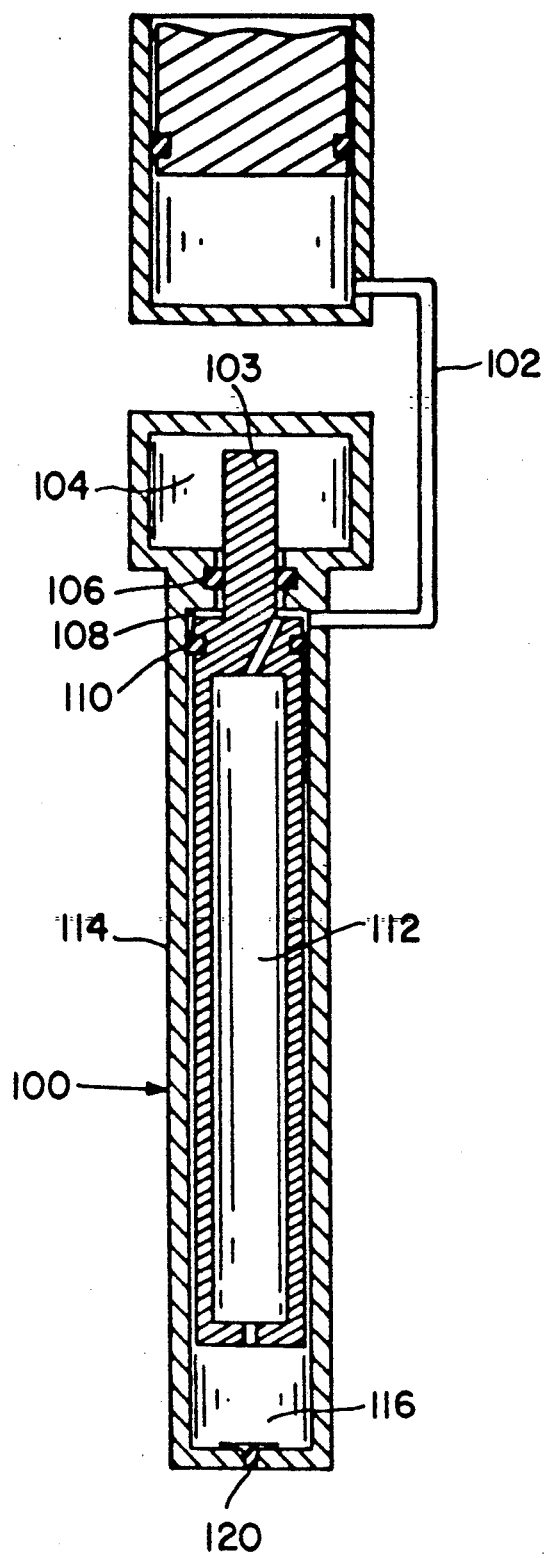
FIG. 2 is a cross-sectional view of a cold finger of a cryogenic refrigerator in fluid contact with the compressed fluid of the linear drive assembly of FIG. 1.

A schematic illustration of the cold finger 100 for a cryogenic refrigerator of the present invention is depicted in FIG. 2.

A nearly sinusoidal pressure variation in a pressurized refrigeration gas such as helium is provided through a supply line 102 from the gas fitting assembly 15 on the compressor 5 of FIG. 1.

Within the housing of the cold finger 100 a cylindrical displacer 114 is free to move in reciprocating motion to change the volumes of a warm space 109 and a cold space 116 within the cold finger. The displacer 114 contains a regenerative heat exchanger 28 comprised of several hundred fine-mesh metal screen discs stacked to form a cylindrical matrix. Helium is free to flow through the regenerator between the warm space 108 and the cold space 24. A piston element 103 extends upwardly from the main body of the displacer 114 into a gas spring volume 104 at the warm end of the cold finger. The operation of the cold finger is more fully described in U.S. Pat. No. 4,545,209 referenced above.

A semiconductor temperature sensor 120 is positioned at the cold end of the displacer 114 for measuring the temperature of the cold space 116. The sensor 120 is used to monitor the cryogenic temperature. The position sensor 80 is used to measure armature displacement.

Another embodiment of a linear drive assembly utilized in cryogenic refrigeration is illustrated in FIG. 4. This embodiment employs a stationary piston 160 mounted to the housing on a flexible tubular stem 162 having an axial bore 164 to provide fluid communication between the cold finger and the compression space 190. The tubular stem 162 is secured to the housing with a ferrule 168 brazed to the outer surface of one end of the stem 162, with nut 166 and seal 165.

Front and rear flexure supports 180 and 182 are used to support the armature 170 relative to the piston 160. The supports 180, 182 assist in maintaining good axial alignment between the piston 160 and the armature 170. The inner cylindrical element 172 of the armature 170 forms a clearance seal 174 with the piston 160 that experiences reduced wear due to the use of the flexible stem 162 and the flexure bearing supports 180 and 182.

A magnet 186 is attached to the armature 170 with a non-magnetic element 187. The magnet 186 reciprocates with the armature so that a sensor positioned within the fluctuating magnetic field of the magnet detects the position of the armature. The sensor can be secured to the housing anywhere within the vicinity of the magnet 186.

The interaction of these system components is now more fully described with reference to the schematic illustration of the control system in FIG. 3.

The reference signal at 136 can be, but is not limited to a sinusoid of certain amplitude and at a frequency optimal to a specific embodiment of the compressor. It may, in principal be any frequency required, but in practice may range between 10 and 200 Hz. The frequency is singular to a specific design and is maintained in close tolerance over the operating range. The amplitude of the wave form is chosen to represent 100% of stroke of the piston.

Figure 5A:
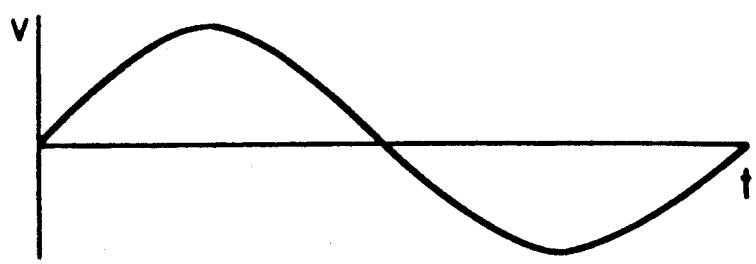
FIGS. 5A–5F schematically illustrate waveforms that occur at certain positions within the circuit of FIG. 3.
Figure 5B:
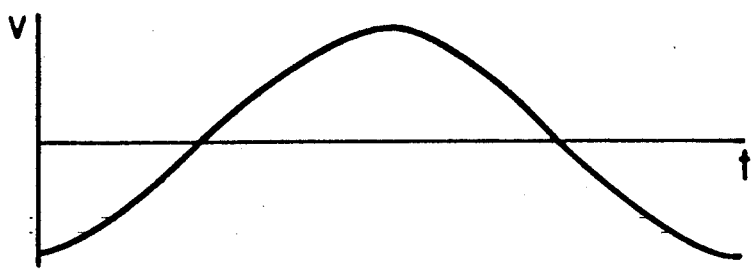
Figure 5C:
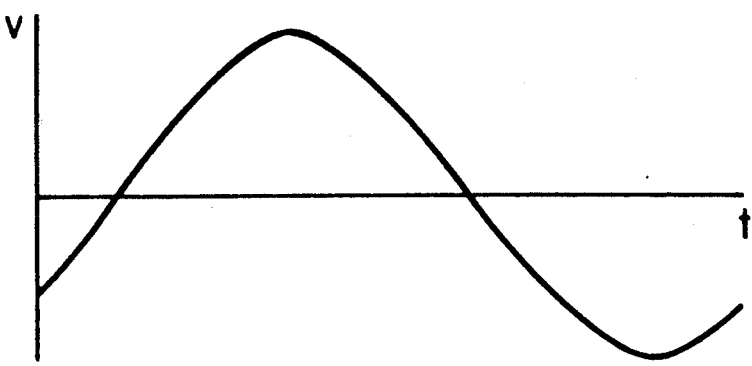

Consider, for example, how the system responds when the measured cold end temperature is considerably higher than the desired target temperature 130. A number of waveforms are shown in FIGS. 5A-5F to illustrate operation of the circuit. The amplitude multiplier 134 will provide no amplitude changes to the reference waveform. A typical output signal for the amplitude multiplier is seen in FIG. 5A. The comparator 138 or second comparator will produce an error signal output when the position feedback 80 as normalized, is not precisely the same as through the amplitude multiplier. FIG. 5B illustrates the output of the normalized position feedback circuit 137. The nature of the error signal output of comparator 138 is not the typically defined null condition. Rather, it is designed to produce a waveform of substantially the same characteristics as the inputs. FIG. 5C shows the output of comparator 138 that provides one input to the current amplifier 140. In the event of a true equality between the compared signals, the comparator 138 continues to provide output due to the natural quadrature relationship existing between command and feedback signals.

Figure 5D:
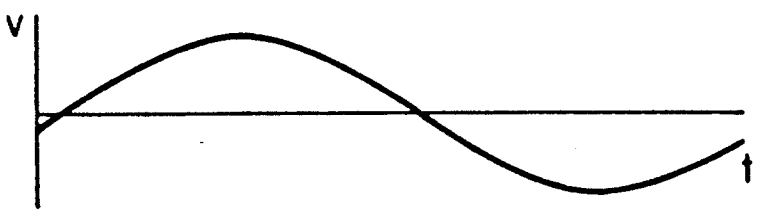

The net error signal provides a current command input to a closed current loop at the current amplifier 140. The feedback portion of the current loop is a normalized measurement of motor current in the linear motor 144. Various techniques can be employed to measure motor current, ranging from simple voltage analogs of the current through a low value resistor to isolating current transformers. The normalization of the current feedback 148 establishes the measured current in a form compatible with the current command input. Such a normalized current feedback signal is illustrated in FIG. 5D. A conveniently expressed relationship may be volts per ampere at the motor. Line 150 represents an output which relates measured current considered detrimental to the system and arises due to some malfunction. The action usually performed in such systems is to shutdown, pending correction of the malfunction. The signal level is generally a logic level change.

The optional line from 146 provides, if and as necessary, a current proportional term to offset an equivalent value of coupled energy reaching the position feedback under influence of the motor. Such conditions may exist in compact embodiments. The signal at this point is amplitude proportional to the coupled energy but opposite in phase for cancellation.

Figure 5E:

The output of the current amplifier 140, as illustrated in FIG. 5E, is the net difference between the current demand imposed by the position loop and actual motor current. The difference signal now forms the input signal to the Pulse Width Modulated (PWM) Motor Drive. The signal level from 140 is generally of the same waveform as the operating frequency and at a low power level. Frequency terms may be added as a function of various motor and resonant dynamics.

Figure 5F:
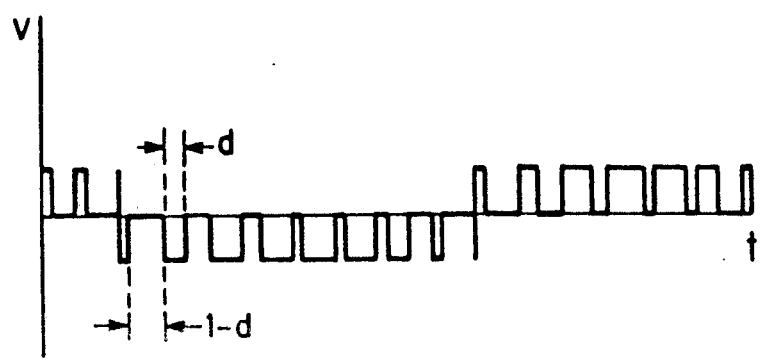

The composite current difference signal is applied to a Pulse Width Modulation (PWM) circuit to convert the dynamic amplitude of the signal to one capable of providing turn-on and turn-off inputs of switching transistors in a circuit arrangement commonly referred to as an H-Bridge. Other arrangements can also be utilized. In the H-Bridge configuration, signals from the PWM are used to selectively turn on two switching transistors at one time to effect current flow from the positive voltage, through the motor load, and to the negative voltage. Following normal convention, the positive going current flow through the motor establishes a positive motion. The value of current flowing through the motor is a function of the time the transistor pair is turned on relative to the time the transistor pair is turned off. FIG. 5F graphically illustrates the output referred to as the pulse width modulated drive signal, of the PWM motor drive unit.

It is convenient to consider the repetitive time period established by the switching frequency as a single event equal to one (1). If the time on of the transistor pair is defined as d, the time off is established as $(1-d)$. The ratio of $d/(1-d)$ establishes, within the context of all circuit parameters involved, the instantaneous current flow to the motor. Since the value of d may be varied in fine increments of microseconds, and may be changed selectively at each new time period of the switching frequency, a high level of control is achievable.

Power efficiency is achieved by the fact that current flows through the turned-on switching transistors in saturated, low impedance conditions. When the transistors are turned off, little or no current flows. Losses are inherently reduced, relative to linear power control techniques.

Figure 3:
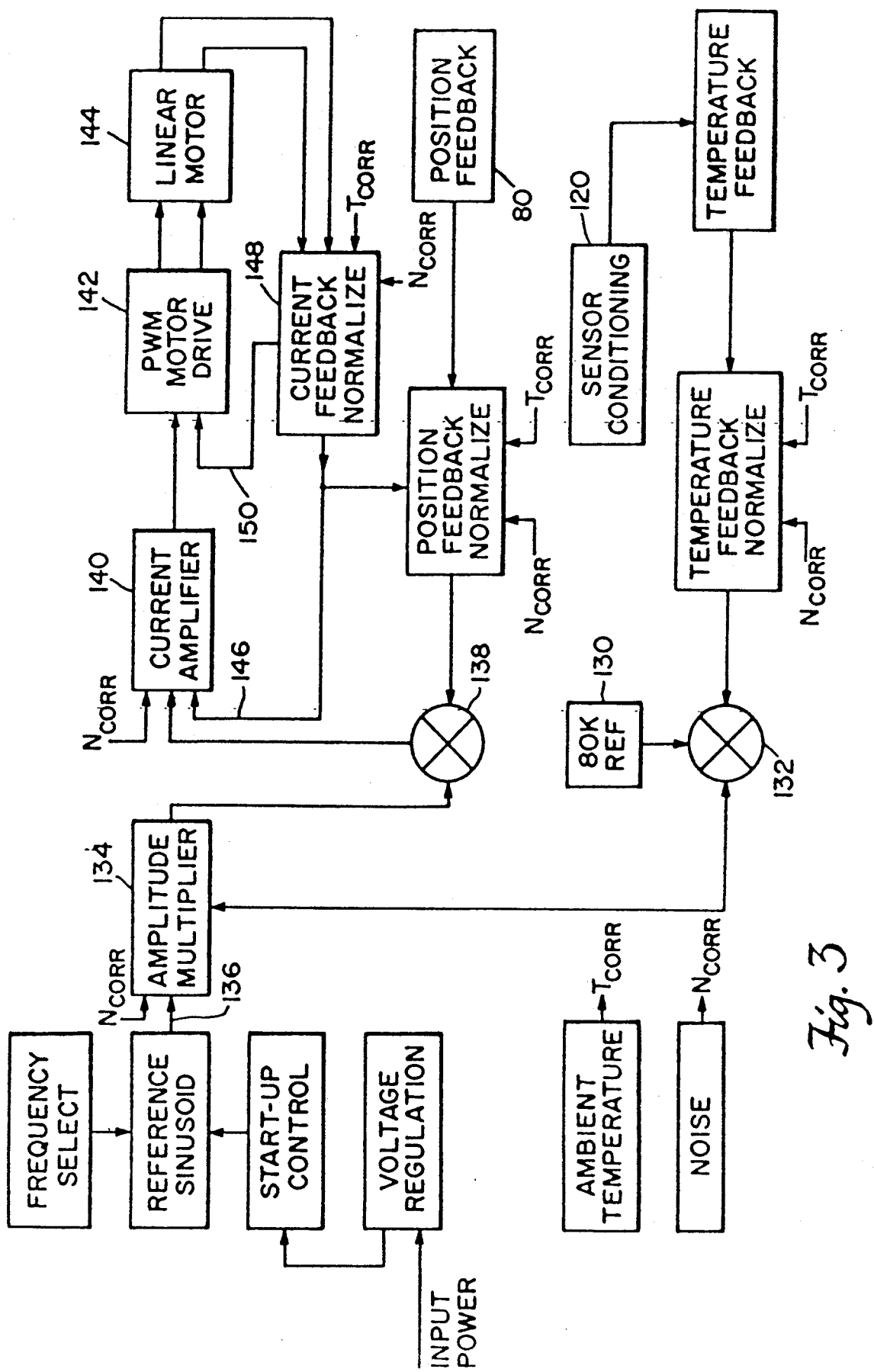
FIG. 3 is a schematic diagram of the temperature control mechanism of the present invention.

It can be seen that positive current and subsequent force may be applied in any manner responsive to the dictates of the current amplifier 140 in FIG. 3. When motion in the opposite direction is required, the actions described are performed by an additional transistor pair which during the positive cycle have been maintained in a turned-off state. These transistors, when turned on, connect the negative voltage to the motor load and thence to the positive voltage, effecting a negative current flow and negative reaction. All actions described beforehand are equally true. The physical result may be considered equal but opposite. In this manner, the piston motion is effectively controlled to the desired instantaneous values required for proper compressor operation.

Turning to the section of FIG. 3 dealing with control of cryogenic temperatures, the system components involved are the sensor conditioning 120, the temperature feedback 121, the temperature feedback normalize 131, the first comparator 132, and the target temperature reference 130.

A usual practice is the use of a silicon semiconductor junction, properly conditioned, as the sensing element of cryogenic temperatures. The junction is located in close thermal proximity to the cryogenic temperature source.

While in no way limited to a specific device, a temperature sensor may be comprised of a silicon transistor that is forward biased through the base-emitter junction with a regulated DC current flow of, for example, 1 milliampere. The voltage from base to emitter will be in the range of 1.06 volts at approximately 77K. At higher temperatures, the voltage will be lower. Conversely, at lower temperatures, the voltage will be greater. In a range above and below the 77K value, the increments of voltage change versus temperature are reasonably linear and monotonic. In close proximity of the stated 77K, the changes are under 2 millivolts per degree Kelvin.

In the interest of minimizing the time required to achieve cool-down, the strategy employed is to maintain full stroke conditions from ambient to a cryogenic temperature which is several degrees above the target temperature. At that point, which may be selected in design, the effect of the aforementioned elements is to reduce the amplitude of the reference waveform at the output of the amplitude multiplier 134 by voltage action of the signal line from the comparator 132. In good practice, the range of linear changes of amplitude as a function of sensor defined cryogenic temperature will extend somewhat below the target temperature to maintain loop linearity before any saturation effects may occur.

Note that the temperature chosen to begin amplitude reduction will effect the gain of the temperature loop. A convenient expression for the gain may be given as the percentage change of amplitude per degree Kelvin. Stability of the temperature loop may be established by proper selection of the gain figure. Additional means of stable operation may be typical in-circuit values of reactive components in passive or active filter combinations, serving as a low-frequency compensation network. The consequence of the temperature loop is to properly adjust the stroke amplitude while maintaining the defined operating stroke frequency at a constant value.

In a preferred embodiment, the current, position and temperature feedback signals are all normalized to correct for noise and variations in operation temperature. For example, a switch mode amplifier within the PWM control generates noise within the circuit which can be substantially corrected by filter techniques. The linear drive motor 144, switch mode amplifier and other elements of the control circuit may generate sufficient heat to perturb efficient operation of the control circuit. Corrections for noise and temperature are made at points in the system indicated by $T_c$ and $N_c$ from circuits 122 and 124 respectively.

The control circuitry as described is analog in nature. All the same actions may be performed by digital circuitry, provided that operational speeds of the control circuitry is sufficiently high to maintain required resolution of the system.

A digital version would preferably use a microprocessor of sufficient data word capacity and computing frequency. An eight bit processor in double precision or a sixteen bit processor in single precision can be used. Operating clock frequency may be established in the 4 megahertz range. Algorithms may be developed for the functional requirements, for example, the reference waveform 136 is modeled by move instructions that incrementally describe the waveform as point by point instructions. The position feedback may remain as described, followed by an analog to digital circuit of $2^{10}$ resolution with a settling time of better than 10 microseconds. Alternately, a linear incremental encoder may be substituted.

We claim:

1. A cryogenic refrigerator having a displacer within a refrigeration cylinder and a compressor comprising a reciprocating armature within an hermetically sealed housing which alternately compresses and expands to cool a portion of a working fluid flowing through the cylinder to cryogenic temperatures, a linear drive motor with a coil assembly for driving the armature, and a temperature control system comprising:

a sensor to detect the temperature of the working fluid and, an analog control circuit that adjusts an amplitude of a reference signal in response to a signal generated by the temperature sensor to vary the displacement of the armature reciprocating at a predetermined frequency such that the temperature of the working fluid is adjustable, the control circuit having a pulse width modulation circuit to convert an input signal to a pulse width modulated drive signal that is applied to the coil.

2. The cryogenic refrigerator of claim 1 wherein the control circuit provides an electrical signal to the coil having a pulse width such that the armature reciprocates at about the predetermined frequency.

3. The cryogenic refrigerator of claim 2 wherein the control circuit adjusts the pulse width of the electrical signal to control the armature displacement.

4. The cryogenic refrigerator of claim 2 wherein said control circuit comprises:

a magnet attached to the reciprocating armature; and a sensor disposed within the magnetic field of the magnet such that a second electrical signal is generated by the sensor such that the second signal is correlated to the position of the magnet.

5. The cryogenic refrigerator of claim 4 wherein the magnetic field about the magnet is substantially decoupled from a second magnetic field generated about the coil.

6. The cryogenic refrigerator of claim 4 wherein the control circuit further comprises:
- a first comparator for comparing the sensed temperature with a reference temperature such that the first comparator generates a signal correlated with the difference between the sensed and reference temperatures;
- an amplitude multiplier for adjusting the amplitude of the reference signal to provide the adjusted reference signal; and
- a second comparator for comparing the adjusted reference signal with a position signal generated by the position sensor such that the second comparator provides an error signal.

7. A cryogenic refrigerator having a compressor comprising a reciprocating armature which alternately compresses and expands a gas in a working volume, a linear drive motor for driving the armature, a vibration isolator system comprising a counterbalance mass attached to the compressor such that an antiphase movement is produced relative to the reciprocating movement of the armature for substantially countering a resulting force exerted by the armature on a refrigerator mounting frame, and a temperature control system, the temperature control system comprising;
- a reciprocating magnetic armature; and
- a control circuit to control the maximum displacement of the armature with respect to the coil to adjust the temperature of the working fluid.

8. The cryogenic refrigerator of claim 7 wherein the armature and the countermass operate at a common frequency within a frequency range.

9. The cryogenic refrigerator of claim 7 wherein said control means is comprised of:
- a magnet attached to the armature; and
- a sensor for detecting the position of said magnet.

10. A linear drive motor with a temperature control system comprising:
- a reciprocating magnetic armature within a housing;
- a coil assembly concentric with the armature to drive the armature;
- a dynamic absorber attached to the housing such that an antiphase movement is produced relative to the reciprocating armature for substantially countering a resulting force exerted by the armature on the housing; and
- a control circuit coupled to the coil to drive the armature of a selected frequency such that control of the armature displacement adjusts the temperature of the working fluid.

* * * * *